United States Patent [19]

Fritsche et al.

[11] Patent Number: 5,356,714
[45] Date of Patent: Oct. 18, 1994

[54] METHOD OF PRIMING OR ONE-COAT PAINTING OF PLASTICS USING WATER-BORNE PAINTS

[75] Inventors: Kirsten Fritsche, Würzburg; Dieter Faul, Bad Dürkheim, both of Fed. Rep. of Germany; Hartmut Metzdorf, Lara Lake, Australia; Jörg Budde, Senden, Fed. Rep. of Germany

[73] Assignee: BASF Lacke + Farben Aktiengesellschaft, Munster, Fed. Rep. of Germany

[21] Appl. No.: 983,544

[22] PCT Filed: Aug. 13, 1991

[86] PCT No.: PCT/EP91/01532

§ 371 Date: Apr. 6, 1993

§ 102(e) Date: Apr. 6, 1993

[87] PCT Pub. No.: WO92/03513

PCT Pub. Date: Mar. 5, 1992

[30] Foreign Application Priority Data

Aug. 28, 1990 [DE] Fed. Rep. of Germany ....... 4027128

[51] Int. Cl.⁵ .............................................. B32B 27/38
[52] U.S. Cl. .................................. 428/413; 427/386; 427/393.5; 427/412.1; 428/414
[58] Field of Search ................. 427/393.5, 412.1, 386; 428/413, 414

[56] References Cited

U.S. PATENT DOCUMENTS

| | | | |
|---|---|---|---|
| 4,085,018 | 4/1978 | Ariga et al. | 525/532 X |
| 4,214,039 | 7/1980 | Steiner et al. | 428/414 |
| 4,518,724 | 5/1985 | Kuwajima et al. | 524/458 X |
| 4,696,763 | 9/1987 | Bentley et al. | 106/14.16 X |

FOREIGN PATENT DOCUMENTS

| | | |
|---|---|---|
| 0225530 | 6/1987 | European Pat. Off. . |
| 0272427 | 6/1988 | European Pat. Off. . |
| 2128773 | 10/1972 | France . |

*Primary Examiner*—Michael Lusignan
*Attorney, Agent, or Firm*—Anne Gerry Sabourin

[57] ABSTRACT

The invention relates to a method of priming or one-coat painting of plastics using water-borne paints which comprises employing a water-borne paint which contains an at least partially protonated product of the reaction of (A) a butadiene- and acrylonitrile-based copolymer containing primary and/or secondary amino groups, or a mixture of such copolymers, and (B) an organic compound which has a number average molecular weight of from 140 to 10,000 and contains, on statistical average, at least 1.5 epoxide groups per molecule, or a mixture of such organic compounds.

6 Claims, No Drawings

METHOD OF PRIMING OR ONE-COAT PAINTING OF PLASTICS USING WATER-BORNE PAINTS

The invention relates to a method of priming or one-coat painting of plastics using water-borne paints, and to the use of a water-borne paint for priming or one-coat painting of plastics.

Plastics are increasingly used in virtually all areas, in particular in automobile production. In motor vehicles, the aim is for there to be no differentiation between the plastic parts and the metallic parts of the body, either optically or through lower resistance to stone chipping, weathering, etc. In order to achieve this, attempts have been made to paint the plastic parts so that there is no differentiation between them and the metallic parts of the body with respect to appearance and resistance to stone chipping, weathering, etc. However, simple overcoating using the paints employed for the metallic parts is unsuccessful due to adhesion problems and/or poor low-temperature impact resistance and/or poor resistance to stone chipping. In order to overcome these problems, plastic parts are painted with a primer, which can then be overcoated with a top coat. For ecological and economic reasons, it is desired to employ water-borne paints for the primer. When water-borne paints are used for priming of plastics, poor notched impact strength and/or poor adhesion between the substrate and primer, in particular between the primer and the top coat applied thereto, are repeatedly observed.

The object of the present invention is to provide water-borne paints which are suitable for priming or one-coat painting of plastics. These paints Should allow, in particular, plastics to be primed in such a manner that no, or greatly reduced, problems occur with respect to low-temperature impact resistance and/or adhesion.

This object is achieved, surprisingly, by a method of priming or one-coat painting of plastics using water-borne paints which comprises employing a water-borne paint which contains an at least partially protonated product of the reaction of (A) a butadiene-acrylonitrile copolymer having an acrylonitrile content of from 5 to 45% by weight and a butadiene content of from 55 to 95% by weight which contains, per molecule, on average from 1.4 to 3.0 primary and/or secondary amino groups, and optionally tertiary amino groups, and has a number average molecular weight of from 500 to 15,000, or a mixture of such butadiene-acrylonitrile copolymers, and (B) an organic compound which has ia number average molecular weight of from 140 to 10,000 and contains, on statistical average, at least 1.5 epoxide groups per molecule, selected from the group comprising
glycidyl ethers of aliphatic diols,
glycidyl ethers of polyphenols,
aromatic epoxy resins obtainable by allowing the abovementioned glycidyl ethers to react with a polyphenol and reacting the resultant product with epichlorohydrin,
glycidyl ethers of polyols obtainable by polymerization of ethylene oxide, propylene oxide, tetrahydrofuran or other cyclic ethers, or a mixture of such organic compounds, where components (A) and (B) are employed in the preparation of the reaction product in such amounts that from 1.05 to 20 equivalents of reactive amine hydrogen atoms from component (A) are present per equivalent of epoxide groups from component (B).

Suitable compounds for component (A) are butadiene-acrylonitrile copolymers containing from 5 to 45% by weight, preferably from 10 to 30% by weight, of acrylonitrile and from 55 to 95% by weight, preferably from 70 to 90% by weight, of butadiene and containing, per molecule, on average 1.4–3.0 primary and/or secondary amino groups, and, if appropriate, tertiary amino groups. The number average molecular weight of the copolymers is advantageously 500–15,000, preferably 2,000–8,000.

The copolymers containing amino groups can be obtained, for example, by reacting butadiene-acrylonitrile copolymers containing carboxyl groups with diamines. Such butadiene-acrylonitrile copolymers containing amino groups are commercially available (for example HYCAR® ATBN 1300 X 16, 1300 X 21 and 1300 X 35).

In addition, butadiene-acrylonitrile copolymers containing amino groups can be prepared by partial hydrogenation of butadiene-acrylonitrile copolymers or by the addition reaction of primary amines with butadiene-acrylonitrile copolymers containing epoxide groups.

It is also possible to employ mixtures of butadiene-acrylonitrile copolymers containing primary and/or secondary amino groups as component (A).

As component (B), organic compounds which have a number average molecular weight of from 140 to 10,000 and contain, on statistical average, at least 1.5, preferably 1.5 to 3.0, particularly preferably 2.0, epoxide groups per molecule are employed. It is also possible to employ mixtures of compounds of this type as component (B).

As component (B), glycidyl ethers of aliphatic diols, such as butanediol or hexanediol, or glycidyl ethers of polyphenols containing, on statistical average, at least two hydroxyl groups per molecule are preferably employed. Examples of suitable polyphenols are 2,2-bis(4-hydroxyphenyl)propane (bisphenol A), 4,4'-dihydroxybenzophenone, 4,4'-dihydroxyphenyl sulfone, 1,1-bis(4-hydroxyphenyl)ethane, 1,1-bis(4-hydroxyphenyl)isobutane, 2,2-bis(4-hydroxy-tert.-butylphenyl) propane, bis(2-hydroxynaphthyl)methane and 1,5-dihydroxynaphthalene.

In some cases, it is desirable to employ aromatic epoxy resins having a relatively high molecular weight as component (B). These can be obtained by reacting the abovementioned diglycidyl ethers with a polyphenol, for example 2,2-bis(4-hydroxyphenyl)propane, and then further reacting the resultant products with epichlorohydrin to give polyglycidyl ethers.

In addition, diglycidyl ethers of polyols, as obtainable, for example, by polymerization of ethylene oxide, propylene oxide, tetrahydrofuran or other cyclic ethers, are suitable as component (B).

To prepare the reaction products to be employed according to the invention, components (A) and (B) are generally employed in such amounts that from 1.05 to 20, preferably from 1.2 to 4.0, equivalents of reactive amine hydrogen atoms of component (A) are present per equivalent of epoxide groups of component (B).

Components (A) and (B) are expediently reacted with one another in an organic solvent or solvent mixture which is inert towards both amino groups and epoxide groups, and at reaction temperatures of 20°–150° C., preferably 50°–110° C. When the epoxide-amine reaction is completed, all or some of the amino groups can be neutralized using acids, and the reaction product protonated in this way can then be dispersed in water. The reaction product can also be added to a water/acid mixture. Organic solvents can then be removed from the resultant dispersions by distillation.

Inorganic and organic acids can be employed for the protonation of the reaction products to be employed according to the invention. Preference is given to organic acids, such as, for example, formic acid, acetic acid, propionic acid or lactic acid.

The reaction products to be employed according to the invention expediently have amine numbers of from 25 to 170, preferably from 40 to 100, mg of KOH/g of solid.

The aqueous dispersions, which can be prepared in the above-described manner, of the products, to be employed according to the invention, of the reaction of components (A) and (B) can in principle be added to any one- or multicomponent water-borne paint which is suitable for priming or one-coat painting of plastics.

The reaction products to be employed according to the invention are preferably employed in one- or two-component water-borne paints which contain a water-dilutable epoxy resin or a mixture of water-dilutable epoxy resins in combination with a crosslinking agent or a mixture of crosslinking agents. Water-dilutable epoxy resins are known and commercially available (cf., for example, the epoxy resins DOW DER 662 (Dow Chemicals) and Beckopox EP 384 (Hoechst AG), and the patent documents EP-A-272 595, EP-A-81 163, EP-A-346 742, DE-A-26 59 989, DE-A-26 022 22, DE-A-26 59 928, DE-A-26 02 221, DE-A-26 02 220, DE-A-26 02 255 and DE-A-23 32 165). Examples of water-dilutable epoxy resins which can be employed are water-dilutable aliphatic, cycloaliphatic or aromatic epoxy resins of the glycidyl ether or glycidyl ester type. The water-dilutability of the epoxy resins can be achieved, for example, by adding suitable emulsifiers and/or by chemical modification of the epoxy resins (for example incorporation of hydrophilic molecule segments). A preference is given to water-dilutable epoxy resins based on polyglycidyl ethers, preferably diglycidyl ethers of polyphenols, preferably diphenols, in particular bisphenol A. The epoxy resins employed generally have number average molecular weights of from 140 to 5,000. However, it is also possible to employ epoxy resins having higher number average molecular weights. In principle, the crosslinking agents employed can be any crosslinking agents which are suitable for water-dilutable epoxy resins.

However, it is preferred to employ crosslinking agents containing primary and/or secondary amino groups. Examples of crosslinking agents of this type are: aliphatic polyamines (for example ethylenediamine, diethylenetriamine, triethylenetetramine and dipropylenetriamine), cycloaliphatic diamines (for example 3,3'-dimethyl-4,4'-diaminodicyclohexylmethane and isophoronediamine), amino-functional, hydrogenated heterocyclic compounds (for example N-aminoethylpiperazine) and polyamidoamines, in particular polyamidoamines of dimeric fatty acids.

A preferred crosslinking agent is the product of the reaction of bisphenol A diglycidyl ether, isophoronediamine and a polyether-polyol, such as, for example, polyethylene glycol. Crosslinking agents of this type are commercially available as "Beckopox special curing agent EH 623" (Hoechst AG) and are described in EP-A-605.

It is preferred to formulate the paints which contain a water-dilutable epoxy resin as binder and a crosslinking agent containing primary and/or secondary amino groups, as two-component systems. It is expedient here to prepare one component from the epoxy resin and the protonated reaction product and the second component from the crosslinking agent containing primary and/or secondary amino groups, if desired together with pigments and/or fillers. The component containing the epoxy resin and the protonated reaction product generally has a pH of <7.0, and the component containing the crosslinking agent containing primary and/or secondary amino groups generally has a pH of >7.0. The two components are mixed just before application.

The term "paint" in this description always, unless expressly stated otherwise, refers to the complete paint, ie, in two-component systems, the paint obtained after mixing the two components.

The reaction products to be employed according to the invention should be incorporated into the water-borne paints in such amounts that the paints contain from 5 to 50% by weight, preferably from 10 to 20% by weight, of the reaction product, the % by weight data being based on the total amount of binders and, if used, crosslinking agents present in the paint.

Particularly good results are obtained if the amount of reaction product employed, the amount of amino-containing crosslinking agent employed and the amount of epoxy resin employed are selected so that all epoxide-reactive secondary and/or primary amino groups present in the reaction product and in the crosslinking agent can react with epoxide groups during curing of the paint.

In addition to the reaction product to be employed according to the invention, binders and, if desired, crosslinking agents, it is of course also possible for the water-borne paints to contain further conventional additives, such as, for example, organic solvents, flow-control agents, light stabilizers, rheology aids, pigments, fillers, catalysts, etc.

The water-borne paints in question generally contain, in the ready-for-use state, from 30 to 80% by weight, preferably from 45 to 70% by weight, of water, from 0 to 50% by weight, preferably from 0 to 10% by weight, of organic solvents, from 1.0 to 25% by weight, preferably from 2 to 10% by weight, of the reaction product to be employed according to the invention, from 5 to 50% by weight, preferably from 10 to 40% by weight, of binders, from 1 to 40% by weight, preferably from 3 to 10% by weight, of crosslinking agents, from 0 to 40% by weight, preferably from 5 to 25% by weight, of pigments and/or fillers and from 0 to 10% by weight of other additives, such as, for example, catalysts, thickeners, flow-control agents, etc, the percent by weight data being based on the total recipe of the paints in the ready-for-use state ( ie, for example, at spraying viscosity).

Since plastics are generally temperature-sensitive, the water-borne paints must generally be cured at temperatures of up to 100° C. in the case of thermoplastics and up to 140° C. in the case of thermosets.

Water-borne paints which contain the reaction products to be employed according to the invention can in principle be used for priming or one-coat painting of all plastics. Examples of suitable plastics are: ABS, AMMA, ASA, CA, CAB, EP, UF, CF, MF, MPF, PF, PAN, PA, PC, PE, HDPE, LDPE, PETP, PMMA, PP, PS, SB, PUR, PVC, RF, SAN, PP-EPDM and UP (abbreviations in accordance with DIN 7728 T1). Preferred plastic substrates are: polycarbonate, polypropylene-EPDM and polyamide. The plastics to be painted may of course be polymer blends, modified plastics or fiber-reinforced plastics. In many cases, it is expedient to pretreat the plastics to be painted, before painting, using suitable methods (for example flame treatment, corona treatment, coating with an adhesion promoter, such as, for example, chlorinated polyolefins, etc).

The water-borne paints which contain the reaction products to be employed according to the invention are preferably employed for priming of plastics and can be applied, for example, by spraying, knife coating or dipping. The plastics primed in this way can easily be overcoated, for example, with one-coat solid or metallic finishes or with two-coat solid or metallic finishes of the base coat/clear coat type.

The invention is described in greater detail in the examples below.

1. Preparation of an aqueous dispersion of the reaction product to be employed according to the invention 359.8 g of HYCAR® ATBN 1300 X 16 (butadiene-acrylonitrile copolymer containing secondary amino groups, containing 16% by weight of acrylonitrile and having a number average molecular weight of 3,500–3,800, and obtainable by reacting a butadiene-acrylonitrile copolymer containing terminal carboxyl groups with aminoethylpiperazine) are dissolved in 174 g of toluene, 46.3 g of a polytetrahydrofuran diglycidyl ether having an epoxide equivalent weight of approximately 420 are added, and the mixture is stirred at 80° C. until virtually no epoxide groups are detectable (after about 10 hours). The mixture is then diluted using 68.4 g of ethylene glycol monobutyl ether and 116.0 g of isobutanol and cooled to 40° C. 6.4 g of glacial acetic acid and 1,588 ml of demineralized water are then added over the course of one hour. The resultant dispersion is freed from organic solvents under reduced pressure and adjusted to a solids content of 21.5% by weight using demineralized water. The amine number of the reaction product is 61.2 mg per g of solid.

2. Preparation of a paint component containing crosslinking agents 170 g of an 80% strength aqueous solution of the epoxy resin crosslinking agent Beckopox EH 623 (manufacturer: Hoechst AG) are predispersed using 460 g of water, 180 g of talc, 320 g of TiO$_2$, 2 g of flame black, 8 g of Bentone SD 2 (Kronos Titan GmbH) and 19 g of Borchigel L75 (50% strength in water, Gebrüder Borchers), and the dispersion is ground in a ball mill to a particle size of 15 μm. 100 g of water are subsequently incorporated into the ground product.

3.1 Preparation of a paint component containing binders and the reaction product to be employed according to the invention 62.6 g of the dispersion described under point 1 and 92 g of an aqueous epoxy resin dispersion based on bisphenol A diglycidyl ether (Beckopox EP 384, manufacturer: Hoechst AG) are mixed.

3.2 Preparation of a paint component containing a styrene-butadiene rubber dispersion instead of the reaction product to be employed according to the invention 29.2 g of an aqueous 50% strength styrene-butadiene rubber dispersion (Lipaton X 5521, manufacturer: Hüls AG) and 84.3 g of the epoxy resin dispersion described under 3.1 are mixed.

4. Preparation and application of the paints, and testing 4.1 126 g of the paint component as per point 2 are mixed with 154.5 g of the paint component as per point 3.1, and the mixture is adjusted to a viscosity (spraying viscosity) of 25–27 sec. (DIN 4 cup) using demineralized water. A polycarbonate sheet which has been cleaned using isopropanol is sprayed with the resultant paint (dry film thickness: 25–30 μm), and the film is cured at 80° C. for 30 minutes after an evaporation time of 10 minutes at room temperature. A commercially available metallic base coat and a commercially available clear coat are subsequently applied on top by the wet-on-wet method, and the coatings are baked at 80° C. for 45 minutes. After storage for 3 days at room temperature, the painted substrates obtained in this way are tested for adhesion (crosshatch test in accordance with DIN 53 151) and for low-temperature impact strength (penetration test in accordance with DIN 53 443, part 2). The results are shown in Table 1.

4.2 126 g of the paint component as per point 2 are mixed with 113.5 g of the paint component as per point 3.2, and the mixture is processed further as described under point 4.1. The substrate painted with this paint is tested in the same way as the substrate obtained as per point 4.1 The test results are shown in Table 1.

4.3 126 g of the paint component as per point 2 are mixed with 84.4 g of the epoxy resin dispersion described under point 3.1, and the mixture is processed further as described under point 4.1. The test results of the substrate painted using this paint are given in Table 1.

TABLE 1

| Test results | | | |
|---|---|---|---|
| Finish as per point | 4.1 | 4.2 | 4.3 |
| Crosshatch test | 0 | 0 | 0 |
| Temperature of the transition (determined in the penetration test) | −20° C. | −6° C. | 0° C. |

We claim:

1. A method of priming or one-coat painting of plastics using water-borne paints which comprises employing a water-borne paint which comprises effective film forming amounts of an at least partially protonated product of the reaction of (A) a butadiene-acrylonitrile copolymer having an acrylonitrile content of from 5 to 45% by weight and a butadiene content of from 55 to 95% by weight which contains, per molecule, on average from 1.4 to 3.0 amino groups selected from the group consisting of primary, secondary and tertiary amino groups and mixtures thereof, and has a number average molecular weight of from 500 to 15,000, or a mixture of such butadiene-acrylonitrile copolymers, and (B) an organic compound which has a number average molecular weight of from 140 to 10,000 and contains, on statistical average, at least 1.5 epoxide groups per molecule, selected from the group consisting of glycidyl ethers of aliphatic diols,
glycidyl ethers of polyphenols,
aromatic epoxy resins obtainable by allowing the abovementioned glycidyl ethers to react with a polyphenol and reacting the resultant product with epichlorohydrin, and diglycidyl ethers of polyols obtainable by polymerization of ethylene oxide, propylene oxide, tetrahydrofuran or other cyclic ethers,
or a mixture of such organic compounds,
where components (A) and (B) are employed in the preparation of the reaction product in such amounts that from 1.05 to 20 equivalents of reactive amine hydrogen atoms from component (A) are present per equivalent of epoxide groups from component (B).

2. A method as claimed in claim 1, wherein the paint includes a water-dilutable epoxy resin or a mixture of water-dilutable epoxy resins as binder.

3. A method as claimed in claim 1, wherein the paint includes a binder selected from the group consisting of eater-dilutable epoxy resins and mixtures thereof.

4. An article having a water-borne paint coating, said coating comprising effective film forming amounts of an at least partially protonated product of the reaction of
(A) a butadiene-acrylonitrile copolymer having an acrylonitrile content of from 5 to 45% by weight and a butadiene content of from 55 to 95% by weight which contains, per molecule, on average from 1.4 to 3.0 amino groups selected from the group consisting of primary, secondary and tertiary amino groups and mixtures thereof, and has a number average molecular weight of from 500 to 15,000, or a mixture of such butadiene-acrylonitrile copolymers, and (B) an organic compound which has a number average molecular weight of from 140 to 10,000 and contains, on statistical average, at least 1.5 epoxide groups per molecule, selected from the group consisting of
glycidyl ethers of aliphatic diols,
glycidyl ethers of polyphenols,
aromatic epoxy resins obtainable by allowing the abovementioned glycidyl ethers to react with a polyphenol and reacting the resultant product with epichlorohydrin, and
glycidyl ethers of polyols obtainable by polymerization of ethylene oxide, propylene oxide, tetrahydrofuran or other cyclic ethers,
or a mixture of such organic compounds,
where components (A) and (B) are employed in the preparation of the reaction product in such amounts that from 1.05 to 20 equivalents of reactive amine hydrogen atoms from component (A) are present per equivalent of epoxide groups from component (B) for priming or one-coat painting of plastics.

5. The article as claimed in claim 4, wherein the paint includes a water-dilutable epoxy resin or a mixture of water-dilutable epoxy resins as binder.

6. The article as claimed in claim 4, wherein the paint includes a crosslinking agent selected from the group consisting of crosslinging agents containing primary amino groups, crosslinking agents containing secondary amino groups and mixtures of such crosslinking agents.

* * * * *